United States Patent
Park et al.

(10) Patent No.: US 8,406,180 B2
(45) Date of Patent: Mar. 26, 2013

(54) METHOD OF PERFORMING RANDOM ACCESS PROCEDURE IN WIRELESS COMMUNICATION SYSTEM

(75) Inventors: Sung Jun Park, Anyang-si (KR); Young Dae Lee, Anyang-si (KR); Seung June Yi, Anyang-si (KR); Sung Duck Chun, Anyang-si (KR)

(73) Assignee: LG Electronics Inc., Seoul (KR)

( * ) Notice: Subject to any disclaimer, the term of this patent is extended or adjusted under 35 U.S.C. 154(b) by 110 days.

(21) Appl. No.: 12/375,480

(22) PCT Filed: Jan. 8, 2008

(86) PCT No.: PCT/KR2008/000090
§ 371 (c)(1),
(2), (4) Date: Jan. 28, 2009

(87) PCT Pub. No.: WO2008/084949
PCT Pub. Date: Jul. 17, 2008

(65) Prior Publication Data
US 2009/0262681 A1    Oct. 22, 2009

(30) Foreign Application Priority Data
Jan. 9, 2007    (KR) .................. 10-2007-0002373

(51) Int. Cl.
*H04W 4/00* (2009.01)
*H04J 3/00* (2006.01)
*H04J 3/06* (2006.01)

(52) U.S. Cl. ......... 370/329; 370/336; 370/338; 370/350

(58) Field of Classification Search .................. 370/329, 370/328, 331, 335, 336, 338, 441, 342, 442, 370/209, 320, 321, 343, 350
See application file for complete search history.

(56) References Cited

U.S. PATENT DOCUMENTS

| | | | |
|---|---|---|---|
| 6,741,605 B1 * | 5/2004 | Vanhoof et al. ............... | 370/447 |
| 7,076,248 B2 * | 7/2006 | Amirijoo et al. ........... | 455/432.1 |
| 7,912,471 B2 * | 3/2011 | Kodikara Patabandi et al. ............................. | 455/450 |
| 2004/0146019 A1 | 7/2004 | Kim et al. | |
| 2005/0002361 A1 | 1/2005 | Dick et al. | |
| 2006/0126570 A1 | 6/2006 | Kim et al. | |
| 2006/0268772 A1 | 11/2006 | Ko et al. | |
| 2007/0153733 A1 * | 7/2007 | Kim et al. .................... | 370/329 |
| 2007/0161377 A1 * | 7/2007 | Kodikara Patabandi et al. ............................. | 455/450 |
| 2007/0206531 A1 * | 9/2007 | Pajukoski et al. ............. | 370/329 |
| 2010/0093386 A1 * | 4/2010 | Damnjanovic et al. ....... | 455/522 |
| 2010/0189071 A1 * | 7/2010 | Kitazoe ........................ | 370/331 |

* cited by examiner

*Primary Examiner* — Kevin C Harper
*Assistant Examiner* — Samina Choudhry
(74) *Attorney, Agent, or Firm* — Birch, Stewart, Kolasch & Birch, LLP (57) ABSTRACT

A method of performing a random access procedure in a wireless communication system includes transmitting a random access preamble, receiving a random access response from a network as a response to the random access preamble, transmitting a connection request message comprising information on a temporary identifier, and receiving a contention resolution message from the network. The temporary identifier is randomly generated and the contention resolution message is addressed to the temporary identifier. Contentions between user equipments can be resolved through a temporary identifier occupying less radio resources in a random access procedure.

16 Claims, 5 Drawing Sheets

METHOD OF PERFORMING RANDOM ACCESS PROCEDURE IN WIRELESS COMMUNICATION SYSTEM

TECHNICAL FIELD

The present invention relates to wireless communication, and more particularly, to a method of performing random access procedure for efficiently using radio resources and promptly resolving collisions among user equipments.

BACKGROUND ART

Third generation partnership project (3GPP) mobile communication systems based on a wideband code division multiple access (WCDMA) radio access technique are widely spread all over the world. High-speed downlink packet access (HSDPA) that can be defined as a first evolutionary stage of WCDMA provides 3GPP with wireless access technique that is highly competitive in the mid-term future. However, since requirements and expectations of users and service providers are continuously increased and developments of competing radio access techniques are continuously in progress, new technical evolutions in 3GPP are required to secure competitiveness in the future.

The 3GPP launched a study project named "Evolved UTRA and UTRAN" at the end of 2004, for the purpose of developing radio transmission technique that can drastically reduce costs while providing high quality services. This 3G long-term evolution (LTE) project is in pursuit of reducing costs of users and service providers and improving service quality, as well as expanding coverage and improving system capacity. The 3G LTE defines high level requirements, such as reduction of cost per bit, increase of service availability, flexible use of frequency bands, simple structure and open interface, and proper power consumption of a user equipment.

There are one or more cells within the coverage of a base station. In addition, a plurality of user equipments can be placed within a cell. Generally, a user equipment performs random access procedure to gain access to a network. The random access procedure is accomplished through a RACH (Random Access Channel), i.e., an uplink transmission channel. The user equipment transmits an initial control message to the network through the RACH. The aim of performing the random access procedure is to obtain time synchronization between the user equipment and the network or to obtain radio resources for uplink transmission.

There are two kinds of random access procedures. In non-contention-based random access procedure, a dedicated identifier for identifying a user equipment is allocated. Therefore, random access procedure can promptly be completed since contention between user equipments does not occur. But resources for the dedicated identifier are needed. On the contrary, in contention-based random access procedure, a user equipment initiates the random access procedure without the dedicated identifier. Identifier for the user equipment is allocated during the random access procedure to resolve contention between user equipments. When the identifier for identifying the user equipment is not efficiently allocated to the user equipment, the contention may not be resolved. As a result, synchronization or uplink transmission may be delayed. Therefore, there is a need for a method of resolving contention in the contention-based random access procedure.

DISCLOSURE OF INVENTION

Technical Problem

A method for efficiently using radio resources during random access procedure is provided. Also, a method for resolving contention in the random access procedure is provided.

Technical Solution

In one aspect, a method of performing a random access procedure in a wireless communication system is provided. The method includes transmitting a random access preamble, receiving a random access response from a network as a response to the random access preamble, transmitting a connection request message comprising information on a temporary identifier, wherein the temporary identifier is randomly generated and receiving a contention resolution message from the network, the contention resolution message being addressed to the temporary identifier.

In another aspect, a method of performing a random access procedure in a wireless communication system includes transmitting a random access preamble through a RACH (Random Access Channel), receiving a random access response through a DL-SCH (Downlink Shared-Channel) as a response to the random access preamble, transmitting a connection request message through a UL-SCH (Uplink Shared-Channel), the connection request message comprising a temporary identifier and receiving a contention resolution message through a DL-SCH, wherein the contention resolution message received through the DL-SCH is addressed to the temporary identifier on a PDCCH.

In still another aspect, a user equipment includes a radio frequency (IF) unit for transmitting and receiving radio signals and a processor coupled to the RF unit and configured to send a random access preamble, receive a random access response from a network as a response to the random access preamble, generate a temporary identifier and send a connection request message comprising information of the temporary identifier.

In still another aspect, a method of performing a random access procedure in a wireless communication system includes receiving a random access preamble from a user equipment, transmitting a random access response to the user equipment as a response to the random access preamble, receiving a connection request message comprising information on a temporary identifier, wherein the temporary identifier is randomly generated by the user equipment and transmitting a contention resolution message to the user equipment, the contention resolution message being addressed to the temporary identifier.

Advantageous Effects

Contentions between user equipments can be resolved through a temporary identifier occupying less radio resources in a random access procedure. By completing the random access procedure faster, prompt uplink transmission or reduction of power consumption can be achieved. Reliability of a wireless communication system can be enhanced.

MODE FOR THE INVENTION

Figure 1:
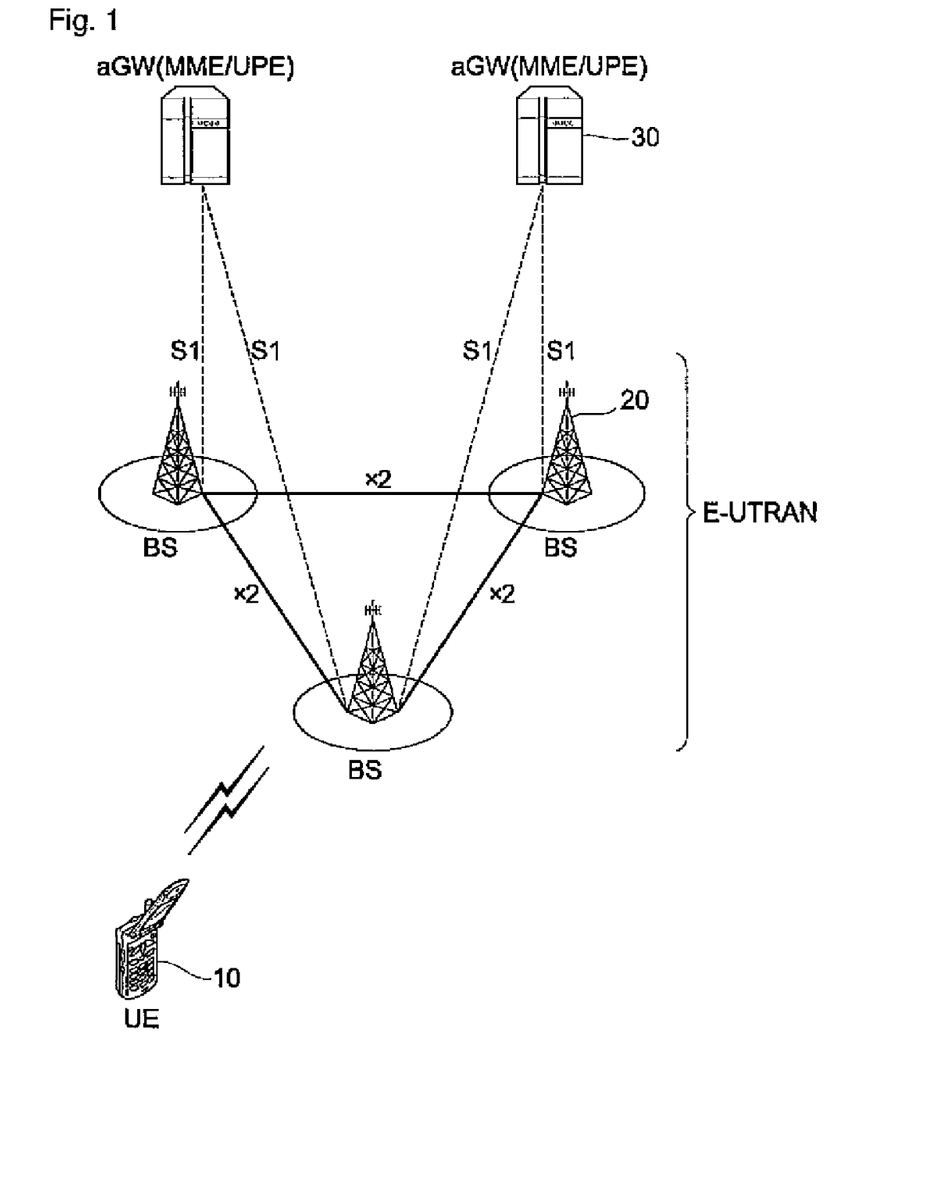
FIG. 1 is a block diagram showing a wireless communication system.

FIG. 1 is a block diagram showing a wireless communication system. This may be a network structure of an E-UMTS (Evolved-Universal Mobile telecommunications System). The E-UMTS system may be referred to as an LTE (Long-term Evolution) system. The wireless communication system can widely be deployed to provide a variety of communication services, such as voices, packet data, and the like.

Referring to FIG. 1, an E-UTRAN (Evolved-UMTS Terrestrial Radio Access Network) includes base stations (BS) 20. A user equipment 10 can be fixed or mobile and can be referred to as another terminology, such as a MS (Mobile Station), a UT (User Terminal), a SS (Subscriber Station), wireless device, or the like. The base station 20 generally is a fixed station that communicates with the user equipment 10 and can be referred to as another terminology, such as an e-NB (evolved-NodeB), BTS (Base Transceiver System), access point, or the like. There are one or more cells within the coverage of the base station 20. An interface for transmitting user traffics or control traffics can be used between base stations 20. Hereinafter, downlink means a communication from the base station 20 to the user equipment 10, and uplink means a communication from the user equipment 10 and the base station 20.

The base station 20 provides the user equipment 10 with termination points of a user plane and a control plane. The base stations 20 can be connected with each other through an X2 interface, and adjacent base stations 20 can have a network of a meshed structure where the X2 interface always exists.

The base station 20 is connected to an EPC (Evolved Packet Core), further specifically, to an aGW (access Gateway) 30 through an S1 interface. The aGW 30 provides a termination point of session and mobility management function of the user equipment 10. A plurality of nodes of the base stations 20 and the aGWs 30 can be connected to each other in a many-to-many relation through the S1 interface. The aGW 30 can be divided into a part for processing user traffics and a part for processing control traffics. In this case, the part for processing traffics of a new user and the part for processing a control traffic can communicate with each other through a new interface. The aGW 30 also can be referred to as an MME/UPE (Mobility Management Entity/User Plane Entity).

Layers of the radio interface protocol between the user equipment and the base station can be classified into L1 (a first layer), L2 (a second layer), and L3 (a third layer) based on the lower three layers of the Open System Interconnection (OSI) model that is well-known to communication systems. The physical layer belonging to the first layer provides information transfer service using a physical channel. A radio resource control (RCC) layer belonging to the third layer serves to control radio resources between the user equipment and the network. The user equipment and the network exchange RRC messages via the RRC layer. The RRC layer can be distributed among network nodes, such as the base station, the aGW, and the like. Or the RRC layer can be located only in the base station or the aGW.

Figure 2:
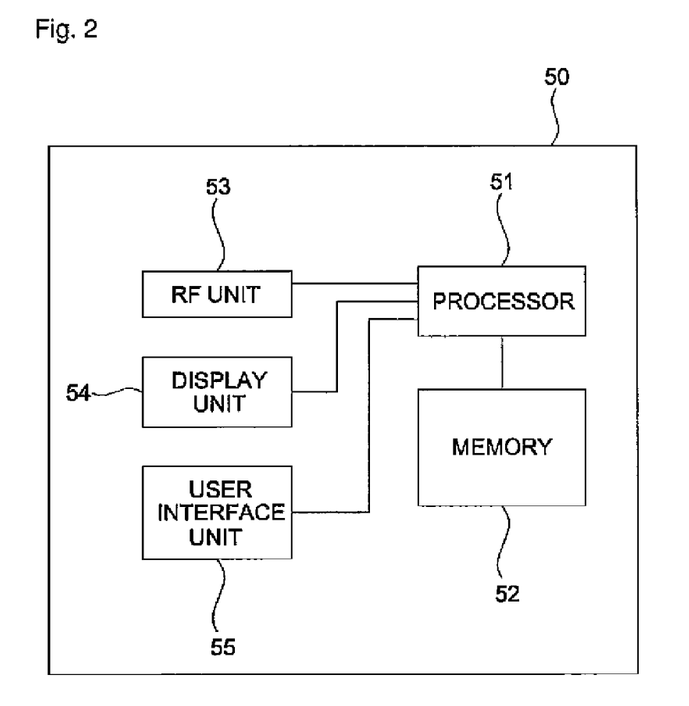
FIG. 2 is a block diagram showing constitutional elements of a user equipment.

FIG. 2 is a block diagram showing constitutional elements of a user equipment. A user equipment 50 includes a processor 51, memory 52, an RF unit 53, a display unit 54, and a user interface unit 55. The memory 52 coupled with the processor 51 stores operating systems, applications, and general files. The display unit 54 displays a variety of information on the user equipment and may use a well-known element, such as an LCD (Liquid Crystal Display), OLED (Organic Light Emitting Diode), or the like. The user interface unit 55 can be configured with a combination of well-known user interfaces such as a keypad, touch screen, and the like. The RF unit 53 coupled to the processor 53 transmits and/or receives radio signals.

Functions of layers of the radio interface protocol can be implemented in the processor 51. The processor 51 can provide control plane and user plane.

The radio interface protocol includes a physical layer, a data link layer, and a network layer in horizontal plane, and user plane for transmitting user data and control plane for transferring control signals in vertical plane.

Figure 3:
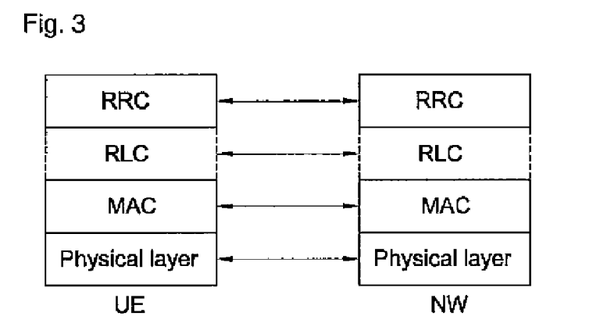
FIG. 3 is a block diagram showing the control plane of a radio interface protocol.
Figure 4:
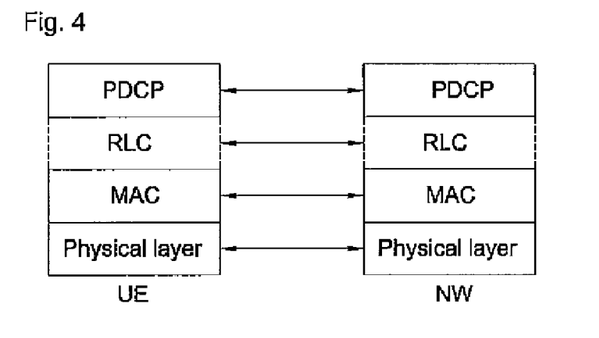
FIG. 4 is a block diagram showing the user plane of a radio interface protocol.

FIG. 3 is a block diagram showing control plane of the radio interface protocol. FIG. 4 is a block diagram showing user plane of the radio interface protocol. FIGS. 3 and 4 show the structure of the radio interface protocol between the user equipment and the E-UTRAN based on the 3GPP radio access network specification.

Referring to FIGS. 3 and 4, a physical layer, i.e., the first layer, provides an information transfer service to upper layers through a physical channel. The physical layer is connected to the MAC (Medium Access Control) layer, i.e., an upper layer of the physical layer, through a transport channel. Data are moved between the MAC layer and the physical layer through the transport channel. Between different physical layers, i.e., the physical layer of a transmitter and the physical layer of a receiver, data are moved through the physical channel.

The MAC layer provides a service to a RLC (Radio Link Control) layer, i.e., an upper layer of the MAC layer, through a logical channel. The RLC layer in the second layer supports reliable data transfer. The functions of the RLC layer can be implemented as a functional block within the MAC layer, and in this case, the RLC layer may not exist.

A PDCP (Packet Data Convergence Protocol) belonging to the second layer performs header compression function. When transmitting an Internet Protocol (IP) packet such as an IPv4 packet or an IPv6 packet, the header of the IP packet may contain relatively large and unnecessary control information. The PDCP layer reduces the header size of the IP packet so as to efficiently transmit the IP packet.

A RRC (Radio Resource Control) layer belonging to the third layer is defined only on the control plane. The RRC layer serves to control the logical channel, the transport channel, and the physical channel in association with configuration, reconfiguration, and release of Radio Bearers (RBs). The RB is a service provided by the second layer for data transmission between the user equipment and the E-UTRAN.

A downlink transport channel includes a BCH (Broadcast Channel) for transmitting system information and a DL-SCH (Downlink-Shared Channel) for transmitting user traffics or control messages. Multicast traffics, broadcast traffics and control messages can be transmitted through the DL-SCH or a separate DL-MCH (Downlink-Multicast Channel). An uplink transport channel includes a RACH (Random Access Channel) for transmitting an initial control message and an UL-SCH (Uplink-Shared Channel) for transmitting user traffics or control messages.

Generally, a user equipment performs random access procedure to obtain time synchronization with a network or to obtain radio resources for transmitting uplink data.

For example, a user equipment is going to initially access to a cell after power is turned on. To access the cell, the user equipment needs to obtain time synchronization for a downlink channel in order to receive system information of the cell. After receiving the system information, the user equipment can transmits a connection request message for an RRC connection. To obtain time synchronization, the user equipment has to perform random access procedure. Using the random access procedure, the user equipment can request radio resources for transmitting the connection request message to the cell. A base station that has received the radio resource request allocates appropriate radio resources to the user equipment so that the user equipment can transmit the connection request message.

For another example, it is assumed that a user equipment has an RRC connection with a base station. The base station schedules allocation of radio resource for the user equipment. When there are no more uplink data, the buffer of the user equipment is empty and the base station does not allocate uplink radio resources. It is inefficient to allocate uplink radio resources to the user equipment that does not use the uplink radio resources. The buffer status of the user equipment is reported to the network periodically or non-periodically. When new data is arrived in the buffer of the user equipment, the user equipment needs to perform random access procedure in order to obtain uplink radio resources. Using the random access procedure the user equipment requests radio resources to the base station.

Hereinafter, a RACH of the WCDMA (Wideband Code Division Multiple Access) is described. The RACH is used to transmit short uplink data. Some RRC messages, such as an RRC connection request message, cell update message, URA update message, and the like, are transmitted through the RACH. A logical channel, such as a CCCH (Common Control Channel), DCCH (Dedicated Control Channel), or DTCH (Dedicated Traffic Channel), can be mapped to the transport channel RACH, and the RACH is mapped to a physical channel PRACH (Physical Random Access Channel).

Figure 5:
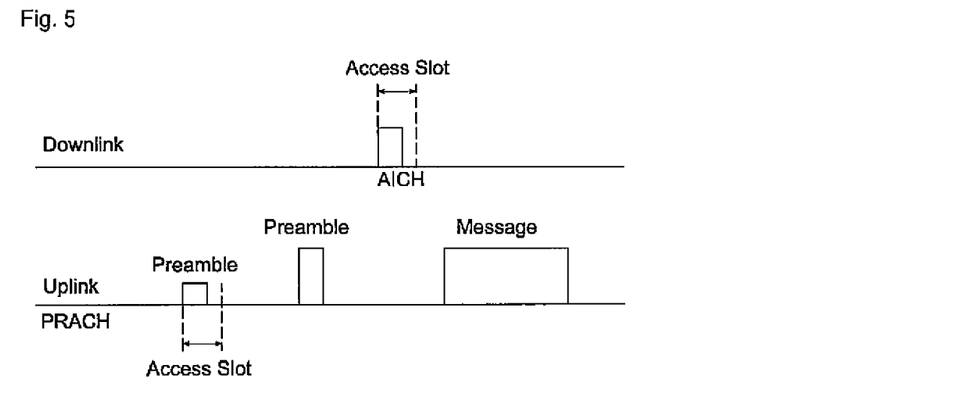
FIG. 5 is a view showing an example of a PRACH.

FIG. 5 is a view showing an example of a PRACH.

Referring to FIG. 5, a uplink physical channel PRACH is divided into a preamble part and a message part. The preamble part performs power ramping function for controlling appropriate transmission power and function for preventing collision with other user equipments. The message part performs function for transmitting a MAC PDU (Protocol Data Unit).

If a MAC layer directs a physical layer to transmit the PRACH, the physical layer first selects an access slot and a signature and then transmits the signature on the PRACH. The signature may also be called as a preamble.

If the user equipment transmits the preamble, a base station transmits a response message through a downlink physical channel AICH (Acquisition Indicator Channel). The base station transmits an Acknowledgement (ACK) or a Not-Acknowledgement (NACK) to the user equipment using the response message on the AICH. If the user equipment receives the ACK, the user equipment transmits the message part of 10 ms or 20 ms long using an OVSF (Orthogonal Variable Spreading Factor) corresponding to the preamble. If the user equipment receives the NACK, the MAC layer directs the physical layer to transmit another preamble after a certain period of time. If the user equipment does not receive the response message, the user equipment transmits a new preamble with power a step higher than that of the previous preamble after a predetermined number of access slots.

Figure 6:
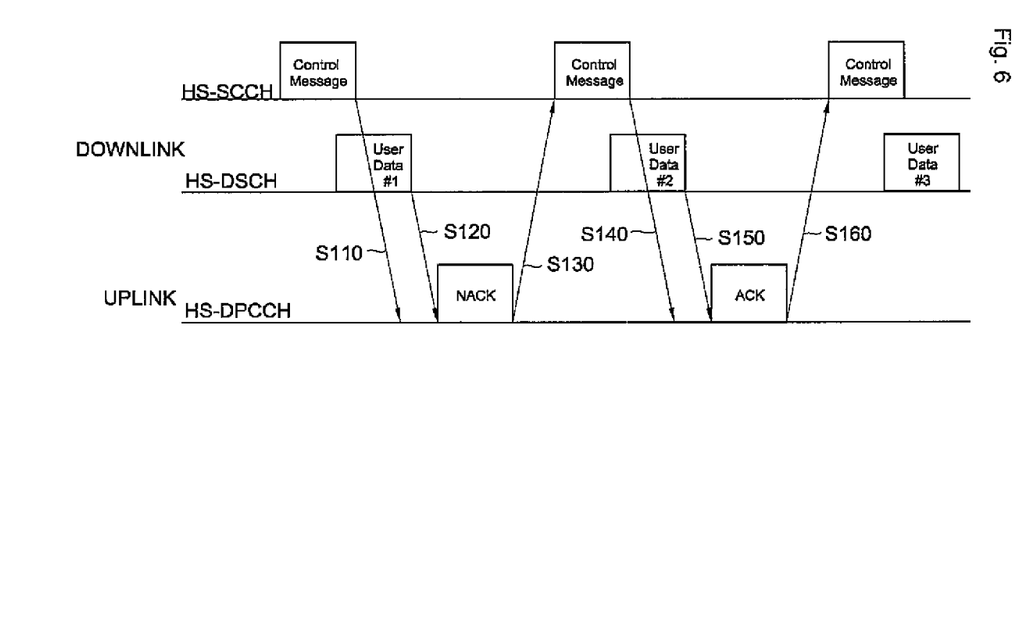
FIG. 6 is a conceptual view showing a HARQ method.

FIG. 6 is a conceptual view showing a HARQ (Hybrid Automatic Repeat Request) method. It shows implementation method of the HARQ method in a downlink physical layer of a radio packet communication system.

Referring to FIG. 6, a base station transmits a control message to a user equipment through a downlink control channel S110. The base station transmits user data to the user equipment through a downlink shared channel S120. The downlink control channel may be a High Speed-Shared Control Channel (HS-SCCH) and the downlink shared channel may be a High Speed-Downlink Shared Channel (HS-DSCH). The control message includes information on the user equipment that is to receive a packet and information on the format of the user data (code rate, modulation scheme, data amount, and the like). After receiving the control message on the HS-SCCH, the user equipment can know the format and transmission of the user data.

When the user equipment fails to decode the user data, the user equipment transmits a NACK signal to the base station S130. The NACK signal can be transmitted through a High Speed-Dedicated Physical Control Channel (HS-DPCCH). The base station receiving the NACK signal senses failure of transmitting the user data. The base station retransmits the user data and the control message for the user data S140 and S150. The user equipment may retry decoding the user data by combining the retransmitted data with the data previously received.

If the user equipment succeeds to decode the user data, the user equipment transmits an ACK signal to the base station S160. The ACK signal can be transmitted through the HS-DPCCH. The base station receiving the ACK signal senses success of transmitting the user data and performs transmitting next user data.

Figure 7:
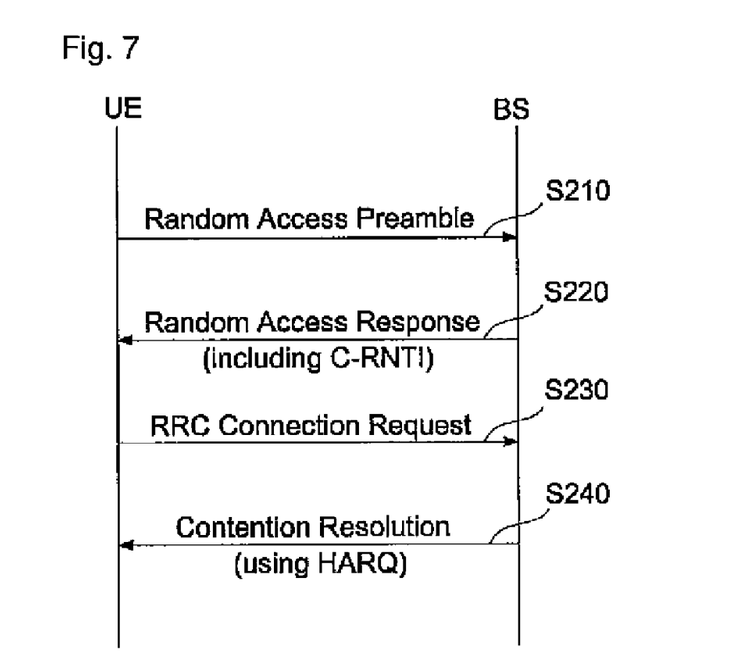
FIG. 7 is a flowchart illustrating an example of a procedure of the user equipment initially connecting to a base station.

FIG. 7 is a flowchart illustrating an example of a procedure of the user equipment initially connecting to a base station.

Referring to FIG. 7, a user equipment transmits a random access preamble to a base station S210. A user equipment selects the random access preamble among a set of random access preambles and radio resources for a PRACH based on system information received from a base station. The random access preamble is transmitted on the PRACH.

The base station transmits a random access response to the user equipment as a response to the random access preamble S220. The random access response includes time advance information and information on radio resource allocation of an RRC connection request message. In addition, the random access response may contain a temporary C-RNTI (Cell-Radio Network Temporary Identity). A C-RNTI is used as an identifier of the user equipment in UTRAN/E-UTRAN. The C-RNTI is an identifier for identifying a user equipment within a cell, and the base station is in charge of allocating and withdrawing the identifier. If a user equipment enters into a new cell, a C-RNTI is assigned by the base station. The temporary C-RNTI may have same format with the C-RNTI or generated from the C-RNTI. The temporary C-RNI is used to identify the user equipment in the random access procedure. When the random access procedure is completed without collision with other user equipments, the user equipment may consider the temporary C-RNTI as the C-RNTI.

The user equipment transmits an RRC connection request message, based on information on radio resource allocation contained in the random access response S230.

After receiving the RRC connection request message from the user equipment, the base station transmits a contention resolution message to the user equipment S240. The contention resolution message contains a unique identifier of the user equipment for resolving contention. An IMSI (International Mobile Station Identity), P-TMSI (Packet-Temporary Mobile Subscriber Identity), C-RNTI, or the like can be the unique identifier. The P-TMSI is an identifier for identifying the user equipment in a core network (CN), and the aGW is in charge of allocating and withdrawing the identifier. The RRC contention resolution message is transmitted using a HARQ method. When the RRC contention resolution message is transmitted to the user equipment, a message including the temporary C-RNTI allocated in the random access response message is transmitted through a PDCCH (Physical Downlink Control Channel) to address the RRC contention resolution message. The PDCCH is a downlink control channel used by a physical layer.

The random access procedure can be performed after a user equipment is already connected to a base station. The user equipment has already a C-RNTI. A base station should always allocate a new temporary C-RNTI after receiving a random access preamble. In this case, the user equipment already having the C-RNTI meets a problem of duplicated allocation of C-RNTIs. In addition, since the size of the random access response message is increased, possibility of transmission error of the random access response message is increased. One solution to resolve duplicated allocation of C-RNTI is that the user equipment informs whether it has an already allocated C-RNTI through the random access preamble. However, if the random access preamble carries additional information, contention may be increased due to limited number of available random access preambles.

Contention occurs when two or more user equipments simultaneously transmit same random access preamble. Although the contention occurs, a base station allocates a temporary C-RNTI and sends one random access response including the temporary C-RNTI. The two or more user equipments receive the random access response and transmit a RRC connection request message. When the base station transmits the temporary C-RNTI on the PDCCH to address a RRC contention resolution message, each of the two or more user equipments determines the temporary C-RNTI as its own and receives the RRC contention resolution message. Since the RRC contention resolution message uses a HARQ method, there may be a problem in that a plurality of HARQ ACK/NACK signals is transmitted from the two or more user equipments.

Figure 8:
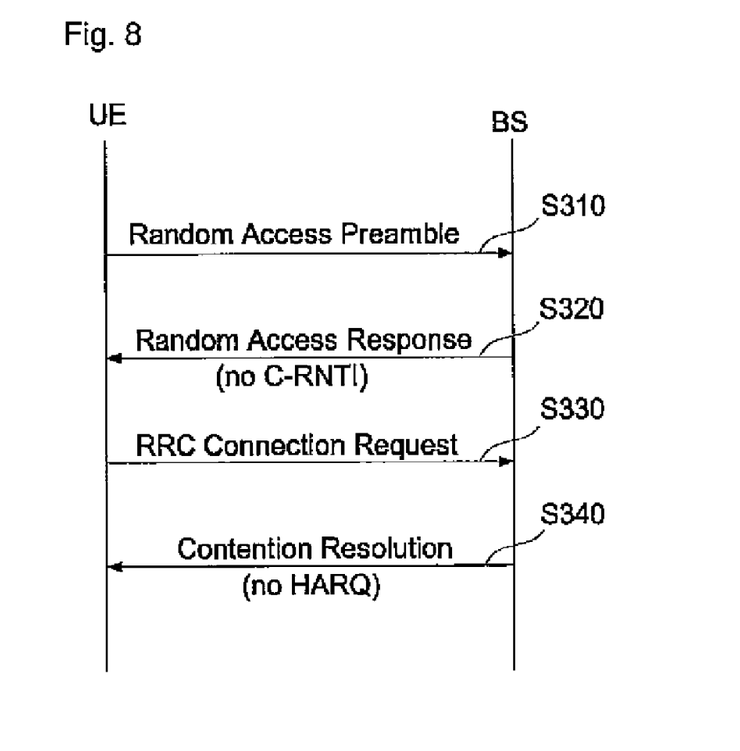
FIG. 8 is a flowchart illustrating another example of a procedure of the user equipment initially connecting to a base station.

FIG. 8 is a flowchart illustrating another example of a procedure of the user equipment initially connecting to a base station.

Referring to FIG. 8, a user equipment transmits a random access preamble to a base station S310. A user equipment selects the random access preamble among a set of random access preambles and radio resources for a PRACH based on system information received from a base station.

The base station transmits a random access response to the user equipment as a response to the random access preamble S320. The random access response may include time advance information, information on uplink radio resource allocation. The random access response does not contain information on a temporary C-RNTI.

The user equipment transmits an RRC connection request message based on the information on the uplink radio resource allocation S330.

After receiving the RRC connection request message from the user equipment, the base station transmits a contention resolution message to the user equipment S340. The contention resolution message contains a unique identifier of the user equipment for contention resolution. The unique identifier may include an International Mobile Subscriber Identity (IMSI), a Packet Temporary Mobile Subscriber Identity (PT-MSI), C-RNTI, or the like. The contention resolution message is addressed to an RA-RNTI (Random Access-Radio Network Temporary Identity) on a PDCCH. The RA-RNTI is an identifier for simultaneously identifying all user equipments trying a random access in a specific section. For example, the RA-RNTI is transmitted through the PDCCH when the random access response is transmitted. At this point, since all user equipments that have tried a random access for a specific period of time receive the RA-RNTI through the PDCCH, the user equipments can receive a message on a DL-SCH addressed to the RA-RNTI on the PDCCH.

A HARQ method cannot be used for transmitting the contention resolution message. A C-RNTI allocated to a user equipment is transmitted to the user equipment through a RRC contention resolution message. Until the user equipment normally receives the RRC contention resolution message and is allocated with its own C-RNTI, a base station identifies user equipments using a RA-RNTI. However, since the RA-RNTI is a common identifier for identifying all user equipments trying a random access, each of the user equipments cannot be individually identified. If the RRC contention resolution message is transmitted in the HARQ method, there is a problem in that all the user equipments that have tried a random access may transmit an ACK/NACK signal for the HARQ method.

As it is difficult to use the HARQ method in transmission of a RRC contention resolution message, the size of the RRC contention resolution message is to be restricted. In this case, since data of a sufficient amount cannot be transmitted through the RRC contention resolution message, probability of transmission error can be increased.

Figure 9:
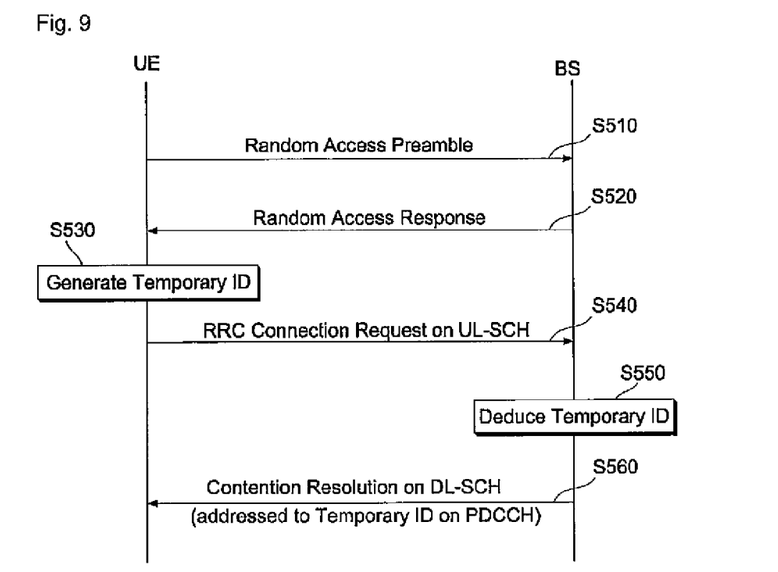
FIG. 9 is a flowchart illustrating a method of performing a random access procedure according to an embodiment of the present invention.

FIG. 9 is a flowchart illustrating a method of performing a random access procedure according to an embodiment of the present invention.

Referring to FIG. 9, a user equipment UE transmits a random access preamble to a base station BS S510. A user equipment selects the random access preamble among a set of random access preambles and radio resources for a PRACH based on system information received from a base station.

The base station transmits a random access response to the user equipment as a response to the random access preamble S520.

The user equipment generates a temporary identifier (ID) S530. The temporary identifier can also be referred to as a T-RNTI, Random HD2, Secondary Random ID, Secondary C-RNTI, R-RNTI, Reserved C-RNTI, or RC-RNTI. There can be a plurality of temporary IDs.

The user equipment transmits an RRC connection request message containing the temporary identifier to the base station S540. The RRC connection request message can be transmitted on a ULSCH. The RRC connection request message may contain an index of the temporary identifier. The format of the temporary identifier transmitted through the RRC connection request message may vary.

The user equipment may randomly generate a temporary identifier or select a temporary identifier based on a set of temporary identifiers.

Information for generating a temporary identifier can be transferred to a user equipment through system information or may previously be defined. Alternatively, the information for generating the temporary identifiers can be informed to the user equipment through a random access response message. For example, it is assumed that there are 64 temporary identifiers, and the length of respective temporary identifiers is 16 bits, which is the same as that of the C-RNTI. Each of the temporary identifiers has an index value of 0 to 63. A user equipment randomly selects a temporary identifier among 64 identifiers. If the user equipment selects the 20-th identifier as the temporary identifier, the user equipment includes an index value (e.g., 010100) of the selected 20-th identifier into a RRC connection request message and transmits the RRC connection request message.

A temporary identifier can be selected among a set of random access preambles. For example, it is assumed that a set has 64 random access preambles, and 4 temporary identifiers are reserved for one random access preamble. Temporary identifier 1-1, temporary identifier 1-2, temporary identifier 1-3, and temporary identifier 1-4 are a first set of temporary identifiers reserved in random access preamble 1. Temporary identifier 2-1, temporary identifier 2-2, temporary identifier 2-3, and temporary identifier 2-4 are a second set of temporary identifiers reserved in random access preamble 2. Temporary identifier 3-1, temporary identifier 3-2, temporary identifier 3-3, and temporary identifier 3-4 are a third set of temporary identifiers reserved in random access preamble 3. It is that 64×4=256 temporary identifiers are reserved. If a user equipment transmits random access preamble 3 to a base station, the user equipment randomly selects one of the selectable temporary identifier 3-1, temporary identifier 3-2, temporary identifier 3-3, and temporary identifier 3-4 after receiving a random access response message. If the user equipment selects temporary identifier 3-3, the user equipment includes an index value (e.g., [00001111]: [index of random access preambles; index of the selected temporary identifier]) of temporary identifier 3-3 into a RRC connection request message and transmits the RRC connection request message.

In another embodiment, a user equipment may deduce a temporary identifier using an unique identifier. A RRC connection request message may include information on the unique identifier. A global identifier, IMSI (International Mobile Subscriber Identity), TMSI (Temporary Mobile Subscriber Identity), PTMSI (Packet-TMSI), IMEI (International Mobile Equipment Identity), C-RNTI, TAI (Tracking Area Identity), or the like can be the unique identifier. The temporary identifier can be newly deduced using such unique identifiers. LSB (Least Significant Bit) or MSB (Most Significant Bit) of the unique identifier can be used to deduce the temporary identifier. For example, it is assumed that a unique identifier of 32 bits is '0000 0000 0000 0000 0000 0000 1010 1110'. The user equipment may select LSB four bits '1110' as a temporary identifier. Accordingly, 15-th identifier among 16 identifiers is selected as the temporary identifier.

A RRC connection request message may contains information on a temporary identifier, as well as information on an unique identifier. The temporary identifier can be deduced through information of the unique identifier.

The base station deduces the temporary identifier through the information contained in a RRC connection request message S550.

The base station transmits a contention resolution message through a DL-SCH S560. The contention resolution message may contain an unique identifier (global ID, IMSI, P-TMSI, IMEI, TAI, or C-RNTI) of the user equipment. For example, a C-RNTI allocated to the user equipment is transmitted through the contention resolution message.

By the unique identifier in the contention resolution message, contention resolution is finally accomplished. The contention occurs when two or more user equipments simultaneously transmit the same random access preamble. A user equipment transmits a RRC connection request message including its unique identifier. After confirming the unique identifier in the contention resolution message, the user equipment finally knows success of the random access procedure. Other user equipments that are not confirmed by the unique identifier in the contention resolution message restart new random access procedure.

Generally, a user equipment should first read a control message on a PDCCH to receive a message on a DL-SCH. The control message on the PDCCH informs for which user equipment the data contained in a corresponding TTI (Transmission Time Interval) is transmitted on the DL-SCH. For example, it is assumed that a 16-bit identifier '0000 0100 0000 1111' is transmitted on a PDCCH. A user equipment receives a message on a DL-SCH after the user equipment confirms the identifier on the PDCCH. The user equipment receives the message on the DL-SCH addressed to the identifier on the PDCCH.

A contention resolution message may be addressed by a temporary identifier on a PDCCH. For one example, a contention resolution message contains an index of a temporary identifier. It is assumed that the index value of the temporary identifier in a RRC connection request message is three. After receiving the RRC connection request message, a base station determines that the user equipment uses the third temporary identifier among a set of temporary identifiers. The base station transmits the third temporary identifier on a PDCCH while transmitting a contention resolution message on a DL-SCH.

For another example, a base station may transmit a temporary identifier deduced from an unique identifier in a RRC connection request message through a PDCCH. Criterions for selecting the temporary identifier from the unique identifier can be a specific LSB, MSB, or the like, and such information can be transferred through system information or a paging message. It is assumed that an unique identifier in a RRC connection request message is '0000 0000 0000 1100' and criterion for deducing a temporary identifier using the unique identifier is LSB 4 bits. In this case, after receiving the RRC connection request message, a base station uses LSB 4 bits of the unique identifier (i.e., '1100') to deduce a temporary identifier. Thus, 13-th identifier is selected as the temporary identifier. While a contention resolution message is transmitted on a DL-SCH, the temporary identifier is transmitted on a PDCCH.

After transmitting a RRC connection request message, a user equipment watches a PDCCH in order to confirm a temporary identifier. If the temporary identifier is transmitted on the PDCCH, the user equipment receives the contention resolution message on a DL-SCH. To confirm the temporary identifier, a user equipment utilizes various methods and present inventive concepts dose not limited to.

Alternatively, a contention resolution message may contain a temporary identifier. A user equipment can confirms the temporary identifier after decoding the contention resolution message.

A contention resolution message can be transmitted by using HARQ to reduce transmission error.

Figure 10:
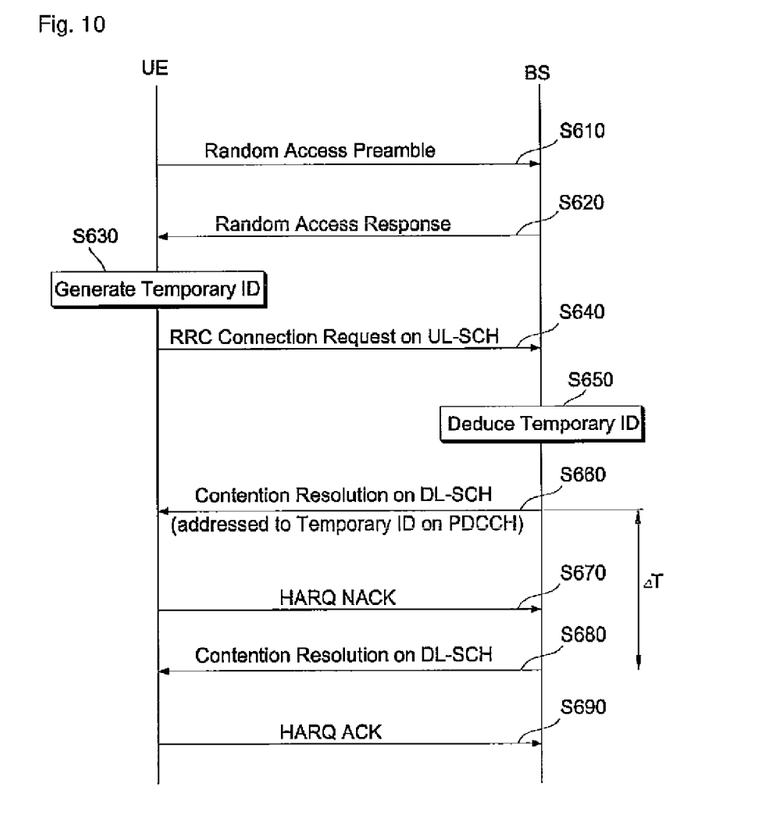
FIG. 10 is a flowchart illustrating a method of performing a random access procedure according to another embodiment of the present invention.

FIG. 10 is a flowchart illustrating a method of performing a random access procedure according to another embodiment of the present invention.

Referring to FIG. 10, a user equipment transmits a random access preamble to a base station S610. The user equipment selects the random access preamble and radio resources for PRACH based on the system information received firm the base station.

The base station transmits a random access response to the user equipment as a response of the random access preamble S620. The random access response may include an unique identifier to be allocated to the user equipment, e.g., C-RNTI, or a temporary C-RNTI.

The random access response can be transmitted on a single DL-SCH as responses of multiple random access preambles. Or, multiple random access responses can be transmitted on multiple DL-SCHs depending on a purpose of random access procedure. Purposes of random access are classified into an initial connection, request for uplink resources, and handover. Random access responses for same purpose use same DL-SCH. For example, random access responses for user equipments that have tried a random access for the purpose of initial connection are transmitted through one DL-SCH, and random access responses for user equipments that have tried a random access for the purpose of maintaining synchronization are transmitted through another DL-SCH.

The user equipment randomly generates (or selects) a temporary identifier S630. The temporary identifier can be selected depending on system information, a previously defined specification, or information on the random access response. For example, a set of 64 candidate identifiers are informed through the system information, and the user equipment can select the temporary identifier in the set. For another example, the temporary identifier is selected among candidate identifiers associated with the random access preamble.

A temporary identifier can be generated from an unique identifier contained in a RRC connection request message. A specific LSB or MSB of the unique identifier can be used for generating the temporary identifier. The user equipment may store the temporary identifier in a memory in order to read a contention resolution message.

The user equipment transmits an RRC connection request message containing information on the temporary identifier S640.

The base station deduces the temporary identifier using the information in the RRC connection request message S650. For example, the base station may deduce the temporary identifier from the index of the temporary identifier in the RRC connection request message. For another example, the base station may deduce the temporary identifier from the unique identifier in the RRC connection request message.

After successfully receiving the RRC connection request message, the base station transmits a contention resolution message to the user equipment S660. In addition, the temporary identifier is transmitted through the PDCCH to address the contention resolution message. Alternatively, the temporary identifier is transmitted through the contention resolution message.

If the user equipment does not receive the contention resolution message normally, the user equipment transmits a NACK signal to the base station S670.

If the base station receives the NACK signal, the base station retransmits the contention resolution message to the user equipment S680. The base station may not transmit the temporary identifier on the PDCCH when retransmitting the contention resolution message. The time interval ΔT between the initial transmission and the retransmission can be previously determined. A synchronous HARQ can be used. The synchronous HARQ means that transmission performs under synchronization between the initial transmission and the retransmission. In the synchronous HARQ, a base station may not transmit any uplink resource grant for retransmission.

When the user equipment successfully receives the RRC resolution message, the user equipment transmits a ACK signal S690.

The functions described in connection with the embodiments disclosed herein may be performed by implemented by hardware, software or a combination thereof. The hardware may be implemented by a microprocessor, a controller, an application specific integrated circuit (ASIC) and a processor. Design, development and implementation of the software are well known to those skilled in the art based on the detailed description.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims. Therefore, all changes and modifications that fall within the metes and bounds of the claims, or equivalence of such metes and bounds are intended to be embraced by the appended claims.

The invention claimed is:

1. A method of performing a random access procedure by a user equipment in a wireless communication system, the method comprising:

transmitting, by the user equipment, a random access preamble to a base station;

receiving, by the user equipment, a random access response from the base station as a response to the random access preamble;

generating, by the user equipment, a temporary identifier that is selected based on a set of random access preambles and a plurality of temporary identifiers reserved for each random access preamble;

transmitting, by the user equipment, a radio resource control (RRC) connection request message comprising information on the temporary identifier and information on a unique identifier of the user equipment to the base station on an uplink shared channel (UL-SCH);

receiving, by the user equipment, the temporary identifier on a physical downlink control channel (PDCCH) from the base station;

if the temporary identifier on the PDCCH is confirmed, receiving, by the user equipment, a first contention resolution message including the unique identifier of the user equipment within a cell from the base station on a downlink shared channel (DL-SCH), the first contention resolution message being addressed to the temporary identifier on the PDCCH;

transmitting, by the user equipment, a non-acknowledgement (NACK) signal to the base station if the first contention resolution message is not successfully received;

receiving, by the user equipment, a second contention resolution message from the base station, the second contention resolution message being a retransmission of the first contention resolution message, a time interval between the first contention resolution message and the second contention resolution message being pre-determined, and the second contention resolution message being received under synchronization with the first contention resolution message; and transmitting, by the user equipment, an acknowledgement (ACK) signal to the base station.

2. The method of claim 1, wherein the unique identifier in the RRC connection request message is one of a global identifier, international mobile subscriber identity (IMSI), temporary mobile subscriber identity (TMSI), packet TMSI (PTMSI), international mobile equipment identity (IMEI), cell radio network temporary identity (C-RNTI) or tracking area identity (TAI).

3. The method of claim 1, wherein the information on the temporary identifier is an index of the temporary identifier.

4. The method of claim 1, wherein the temporary identifier on the PDCCH is deduced, by the base station, based on the information on the temporary identifier or the information on the unique identifier of the user equipment in the RRC connection request message.

5. The method of claim 1, wherein the random access response includes the unique identifier of the user equipment.

6. The method of claim 1, wherein the random access preamble is selected among the set of random access preambles, the set of random access preambles being based on system information received from the base station.

7. The method of claim 1, wherein the random access preamble is transmitted through a RACH (Random Access Channel).

8. The method of claim 1, wherein the random access response is received through a DL-SCH.

9. A user equipment comprising:
a radio frequency (RF) unit for transmitting and receiving radio signals; and
a processor coupled to the RF unit and configured to:
send a random access preamble to a base station;
receive a random access response from the base station as a response to the random access preamble;
generate a temporary identifier that is selected based on a set of random access preambles and a plurality of temporary identifiers reserved for each random access preamble;
send the RRC send a radio resource control (RRC) connection request message comprising information on the temporary identifier and information on a unique identifier of the user equipment, to the base station on an uplink shared channel (UL-SCH);
receive the temporary identifier on a physical downlink control channel (PDCCH) from the base station;
if the temporary identifier on the PDCCH is confirmed, receive a first contention resolution message including the unique identifier of the user equipment within a cell from the base station on a downlink shared channel (DL-SCH), the first contention resolution message being addressed to the temporary identifier on the PDCCH;
transmit a non-acknowledgement (NACK) signal to the base station if the first contention resolution message is not successfully received;
receive a second contention resolution message from the base station, the second contention resolution message being a retransmission of the first contention resolution message, a time interval between the first contention resolution message and the second contention resolution message being pre-determined, and the second contention resolution message being received under synchronization with the first contention resolution message; and
transmit an acknowledgement (ACK) signal to the base station.

10. The user equipment of claim 9, wherein the unique identifier in the RRC connection request message is one of a global identifier, international mobile subscriber identity (IMSI), temporary mobile subscriber identity (TMSI), packet TMSI (PTMSI), international mobile equipment identity (IMEI), cell radio network temporary identity (C-RNTI) or tracking area identity (TAI).

11. The user equipment of claim 9, wherein the information on the temporary identifier is an index of the temporary identifier.

12. The user equipment of claim 9, wherein the temporary identifier on the PDCCH is deduced, by the base station, based on the information on the temporary identifier or the information of the unique identifier of the user equipment in the RRC connection request message.

13. The user equipment of claim 9, wherein the random access response includes the unique identifier of the user equipment.

14. The user equipment of claim 9, wherein the random access preamble is selected among the set of random access preambles, the set of random access preambles being based on system information received from the base station.

15. A method of performing a random access procedure by a base station in a wireless communication system, the method comprising:
receiving, by the base station, a random access preamble from a user equipment;
transmitting, by the base station, a random access response to the user equipment as a response to the random access preamble;
receiving, by the base station, a radio resource control (RRC) connection request message from the user equipment, the connection request message comprising information on a temporary identifier and information on a unique identifier of the user equipment, from the user equipment on an uplink shared channel (UL-SCH), wherein the temporary identifier is selected based on a set of random access preambles and a plurality of temporary identifiers reserved for each random access preamble;
deducing, by the base station, the temporary identifier based on the information on the temporary identifier or the information on the unique identifier of the user equipment in the connection request message;
transmitting, by the base station, the temporary identifier on a physical downlink control channel (PDCCH) to the user equipment;
transmitting, by the base station, a first contention resolution message to the user equipment, the first contention resolution message including a unique identifier of the user equipment within a cell, the first contention resolution message being addressed to the temporary identifier on the PDCCH;
receiving, by the base station, a non-acknowledgement (NACK) signal from the user equipment if the first contention resolution message is not successfully received by the user equipment;

transmitting, by the base station, a second contention resolution message to the user equipment, the second contention resolution message being a retransmission of the first contention resolution message, a time interval between the first contention resolution message and the second contention resolution message being pre-determined, and the second contention resolution message being transmitted under synchronization with the first contention resolution message; and receiving, by the base station, an acknowledgement (ACK) signal from the user equipment.

16. The method of claim 15, wherein the unique identifier in the RRC connection request message is one of a global identifier, international mobile subscriber identity (IMSI), temporary mobile subscriber identity (TMSI), packet TMSI (PTMSI), international mobile equipment identity (IMEI), cell radio network temporary identity (C-RNTI) or tracking area identity (TAI).

* * * * *